June 9, 1953     F. D. McCORMACK     2,641,058
THICKNESS INDICATOR

Filed July 20, 1951     2 Sheets-Sheet 1

INVENTOR.
FOSTER D. McCORMACK
BY H. F. Woodward
atty.

June 9, 1953 F. D. McCORMACK 2,641,058
THICKNESS INDICATOR
Filed July 20, 1951 2 Sheets-Sheet 2

INVENTOR.
FOSTER D. McCORMACK
BY H. F. Woodward
atty.

Patented June 9, 1953

2,641,058

UNITED STATES PATENT OFFICE 2,641,058

THICKNESS INDICATOR

Foster D. McCormack, International Falls, Minn., assignor to Minnesota and Ontario Paper Company, Minneapolis, Minn.

Application July 20, 1951, Serial No. 237,741

4 Claims. (Cl. 33—148)

This invention relates to apparatus for visually indicating and recording the variation in thickness of sheet material and more particularly relates to a machine for indicating the thickness of wet formed fiber composition board.

The apparatus of this invention will be specifically described in connection with indicating and recording the thickness of fiber composition board. It should be understood, however, that the apparatus of this invention is adaptable for use in indicating the thickness of all types of board material.

In the manufacture of fiber composition board, the pulp slurry contains more than 90% of water. The boards are formed and as much water as possible is pressed out during formation. However, due to variations in pulp, the formed sheets may vary considerably in thickness in spite of the fact that the forming apparatus is adjusted to obtain a predetermined or desired thickness. It is essential in the manufacture of fiber for construction and fabrication purposes that the variation in thickness be controlled and known at all times.

For the purpose of this application, there has been elected to set forth one particular structure; but it to be understood that it is presented for illustrative purposes only and not to be accorded any interpretation such as might have the effect of limiting what is claimed short of its true and comprehensive scope in the art.

Referring to the drawings.

Figure 1:
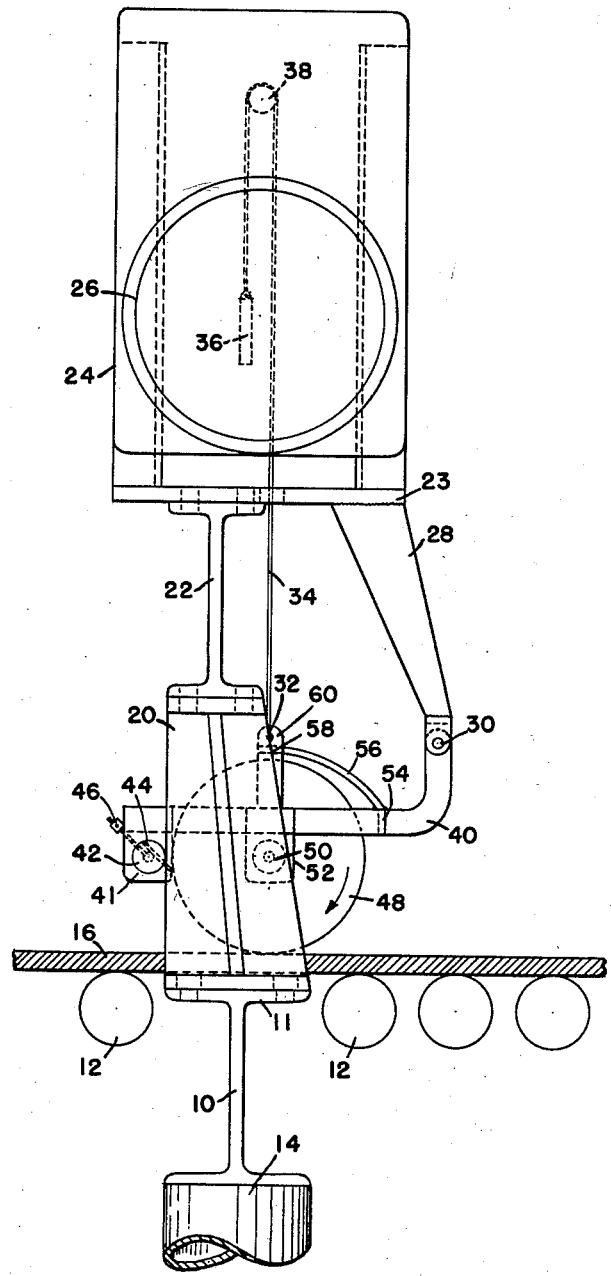
Figure 1 is a side view in elevation of the thickness indicating and recording device.
Figure 2:
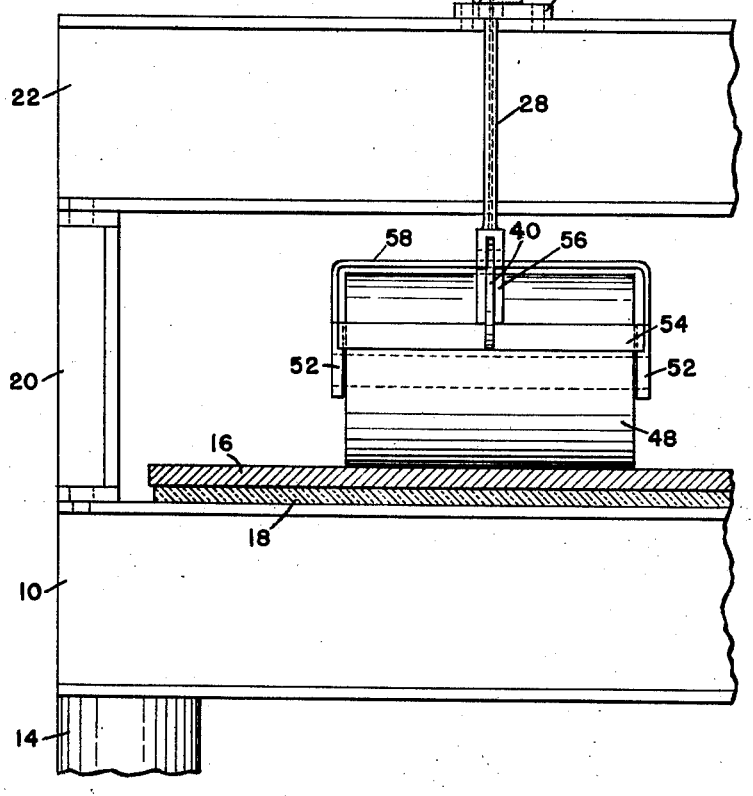
Figure 2 is a rear view in elevation of the thickness indicating and recording device.

In Figures 1 and 2 the reference numeral 14 indicates supporting columns upon which are mounted frame members. Frame members include beam 10 with flange 11 upon which is secured hard surface material 18, which may be Micarta or the like; upright members 20, beam 22, plate 23, casing 24 and casing support 25.

The thickness gauge may be located at the desired place after the formation of the board but the most efficient results are obtained by positioning the gauge after the wet press and before the knurling roll. The board from the wet press moves on roll 12 or the like and passes over member 18 which has the upper surface in a plane substantially the same as the top surface of roll 12.

Figure 3:
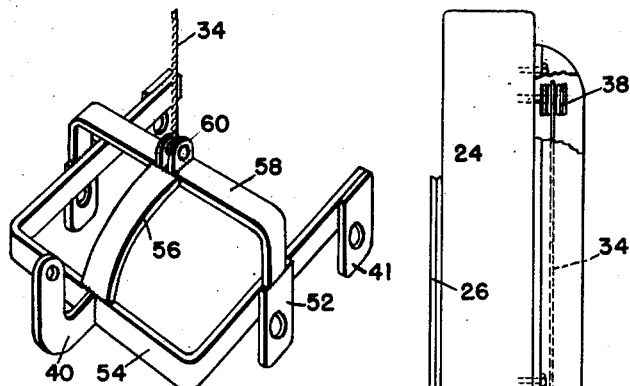
Figure 3 is a perspective view of the gauge roll supporting frame.

To provide accurate results the board contacting roll 48 is supported by frame member shown in Figure 3. The frame includes U-shaped member 54 to which is attached member 58 at approximately the mid-point of the arms of member 54. The roll is rotatably mounted in members 52 and the roll 48 is adapted to rotate in the direction of the movement of the board. Attached to the members 58 and member 54 is curved bar 56. Adjacent the point of attachment of bar 56 to member 54 is arm 40.

To the upper end of arm 40 is moveably secured to a clevis at 30. The clevis is carried by downwardly extending arm 28. The arm 28 is rigidly attached to plate 23 from which plate extends upwardly casing support member 25. In the casing 24 is mounted recording and indicating device of suitable construction, for example, a "Bristol" mechanical motion recorder.

For transmitting raising and lowering movement of the roll 48 there is attached at approximately the mid-point of member 58 cable 34. Cable 34 is attached to member 58 by means of bars 32. The cable passes around gear 38 which transmits the motion to the recorder 26. The free end of cable 34 is provided with a suitable counter-weight 36.

Secured to the ends of the U-shaped member 54 are doctor support brackets 41. The doctor blade 44 is carried by member 42 and for controlling the pressure of the blade 44 against the surface of roll 48 is adjustable weight means 46. The roll 48 is set so that the indicator is at zero reading when the board is of the predetermined or desired thickness (shown in Figure 1) as should be produced by setting of the forming apparatus.

It is essential that the point of attachment of cable 34 to roll carrying frame and the pivot point 30 be in substantially the same horizontal plane when the board is of normal thickness as dictated by the setting of the forming apparatus. By this arrangement more accurate results are obtained and variations in the fiber board are quickly indicated so that the operator can adjust the forming apparatus to obtain the predetermined thickness.

In operation, the board 16, in its travel from the wet press to the knurling roll, passes over flat hard surface member 18. The roll 48 rotates in the direction of movement of the board. Any variation in thickness of the fiber board causes upward or downward movement of the roll 48, which movement is transmitted by the cable 34 to recording instrument. The operator observes such variations and can make immediate correction so that the desired thickness of the board can be obtained.

It is necessary that the surface of the roll 48 be kept clean and doctor 44 removes any material that may be carried or picked up by surface of roll 48.

The use of cable 34, which transmits movement vertically from roll 48 to recording instrument, is an advantage over a solid connection between gauging device and recording device.

What is claimed:

1. In combination with a conveyor for fiber composition board, means for indicating variation from desired thickness of fiber composition board carried by the conveyor comprising a rotatably mounted roll, a frame including a horizontally extending substantially U-shaped member and a substantially vertically extending substantially U-shaped member connected to the horizontally extending U-shaped member at points spaced apart from its ends; a member connecting the two U-shaped members at substantially the mid-point of the U-shaped members, the frame pivotally connected to a support, and means connected to the U-shaped vertical member of the frame for transmitting upward and downward movements of the roll.

2. In combination with a conveyor for fiber board, means for indicating variation in thickness of fiber board carried by and supported on comprising a rotatably mounted roll, a frame including a horizontal substantially U-shaped member a vertically extending substantially U-shaped member connected to the horizontal U-shaped member, a curved member connecting the two U-shaped members, and a cable attached to the vertically extending U-shaped member and operatively connected to a recording and indicating means.

3. A thickness indicator in combination with a substantially horizontally moving conveyor for board, of a roll adapted to ride on the board face, a generally U-shaped substantially horizontally extending frame, a generally U-shaped vertically extending frame secured at substantially the mid-section of the arms of the horizontally extending frame, a curved member connecting the two U-shaped frame members, a member extending from the horizontally extending frame with one end terminating at about the same distance from the horizontal extending frame as the upper extension of the vertically extending frame, and means attached to the vertical frame for transmitting variations in the thickness of the board carried by the conveyor.

4. A thickness indicator in combination with a conveyor, a roll for riding on the face of a board carried by the conveyor, a generally U-shaped member having free ends and mounted above and extending substantially parallel to the conveyor, a second frame attached to the first mentioned frame and extending at substantially right angles therefrom, a member extending from the first mentioned frame and terminating in a plane substantially the same as the upper end of the second mentioned frame, means attached to the free ends of the first mentioned U-shaped frame for cleaning the surface of the roll, and a cable attached to the second mentioned frame and operatively attached to an indicating device.

FOSTER D. McCORMACK.

References Cited in the file of this patent

UNITED STATES PATENTS

| Number | Name | Date |
|---|---|---|
| 842,044 | Wells | Jan. 22, 1907 |
| 1,683,909 | Mavis et al. | Sept. 11, 1928 |
| 1,903,716 | Kalle | Apr. 11, 1933 |
| 2,073,365 | Darlington | Mar. 9, 1937 |

FOREIGN PATENTS

| Number | Country | Date |
|---|---|---|
| 311 | Italy | Sept. 9, 1867 |